(12) United States Patent
Ludan

(10) Patent No.: US 11,389,737 B2
(45) Date of Patent: Jul. 19, 2022

(54) MOBILE ENTERTAINMENT SYSTEM

(71) Applicant: Carcade, Inc., Milwaukee, WI (US)

(72) Inventor: Thomas Ludan, Menomonee Falls, WI (US)

( * ) Notice: Subject to any disclaimer, the term of this patent is extended or adjusted under 35 U.S.C. 154(b) by 0 days.

(21) Appl. No.: 17/317,888

(22) Filed: May 11, 2021

(65) Prior Publication Data

US 2021/0346812 A1 Nov. 11, 2021

Related U.S. Application Data

(60) Provisional application No. 63/023,122, filed on May 11, 2020.

(51) Int. Cl.
*A63F 13/90* (2014.01)
*A63F 13/27* (2014.01)

(52) U.S. Cl.
CPC .............. *A63F 13/90* (2014.09); *A63F 13/27* (2014.09); *A63F 2300/8023* (2013.01)

(58) Field of Classification Search
CPC .......... A63F 13/26; A63F 13/27; A63F 13/90; A63F 2300/8013
See application file for complete search history.

(56) References Cited

U.S. PATENT DOCUMENTS

| | | | |
|---|---|---|---|
| 10,412,800 B1* | 9/2019 | Beattie | H04L 67/12 |
| 2008/0083352 A1* | 4/2008 | Tovani | A47B 83/04 |
| | | | 108/44 |
| 2010/0327616 A1* | 12/2010 | Calhoun | B65G 67/24 |
| | | | 296/26.09 |
| 2015/0146114 A1* | 5/2015 | Williams | B60R 19/48 |
| | | | 348/837 |

\* cited by examiner

*Primary Examiner* — James S. McClellan
(74) *Attorney, Agent, or Firm* — Diana Mederos; Mederos Legal, PLLC

(57) ABSTRACT

A positionable dual-display system for exhibition of and interaction with multimedia content. The dual-display system is housed in an automobile in a retracted parallel configuration and extended into an actuated position at the exterior of the automobile. Patrons view and interact with multimedia content on the displays.

1 Claim, 5 Drawing Sheets

MOBILE ENTERTAINMENT SYSTEM

CROSS-REFERENCE TO RELATED APPLICATION

This application claims the benefit of U.S. provisional application No. 63/023,122, filed May 11, 2020, entitled Mobile Entertainment System, the contents of which are hereby incorporated by reference.

FIELD OF THE DISCLOSURE

The present disclosure relates to a mobile entertainment system. More specifically, the system is a positionable dual display system for the exhibition of and interaction with multimedia content.

BACKGROUND OF THE DISCLOSURE

Many grew up going to friends' houses or local arcades, and in addition to being a new form of technology, this was a social experience. Sharing controllers and calling "next" was an integral part of the gaming experience. While modern technology makes things like online gaming possible, the social gaming experience dwindled.

Recently, companies have developed "game trucks" where they provide either a large truck or trailer with gaming and display sets. These are great, but they ultimately fall short when the customer does not have the space or means of access to host such equipment. It would be a challenge if not impossible to park these gaming rigs in a regular parking spot, in a driveway, or anywhere else without an excessive amount of space to permit a vehicle of such size to maneuver. While these vehicles often pull up in front of houses, that also poses the problem of being setup literally in the street, in traffic. This also is even more challenging when wanting to setup a game center indoors, requiring either massive doors to permit access to these trucks and trailers, or the cumbersome process of loading and unloading displays, consoles, controllers, cords, speakers, and any other equipment required to setup and play games at various venues.

Some mobile systems require extensive and heavy support frame, are not adjustable, and require extensive assembly.

SUMMARY OF THE DISCLOSURE

What is needed is a frameless, stable dual display system that is securely stored, transported, adapted, and accessed quickly.

Exemplary systems comprise an automobile having an interior that houses a pair of display composites in a parallel configuration. The display composites are mounted onto a platform. The platform is extended and retracted. The display composites support display screens from about 50 inches diagonally to about 90 inches diagonally without the need for additional support frames.

The display composites are accessed by pulling the platform through the threshold to the exterior, pulling the screen sliding mounts forward, and actuating the screen positions to align with the patron position.

BRIEF DESCRIPTION OF THE DRAWINGS

The accompanying drawings that are incorporated in and constitute a part of this specification illustrate various embodiments of the disclosure and together with the description serve to explain the principles of the disclosure.

Figure 1:
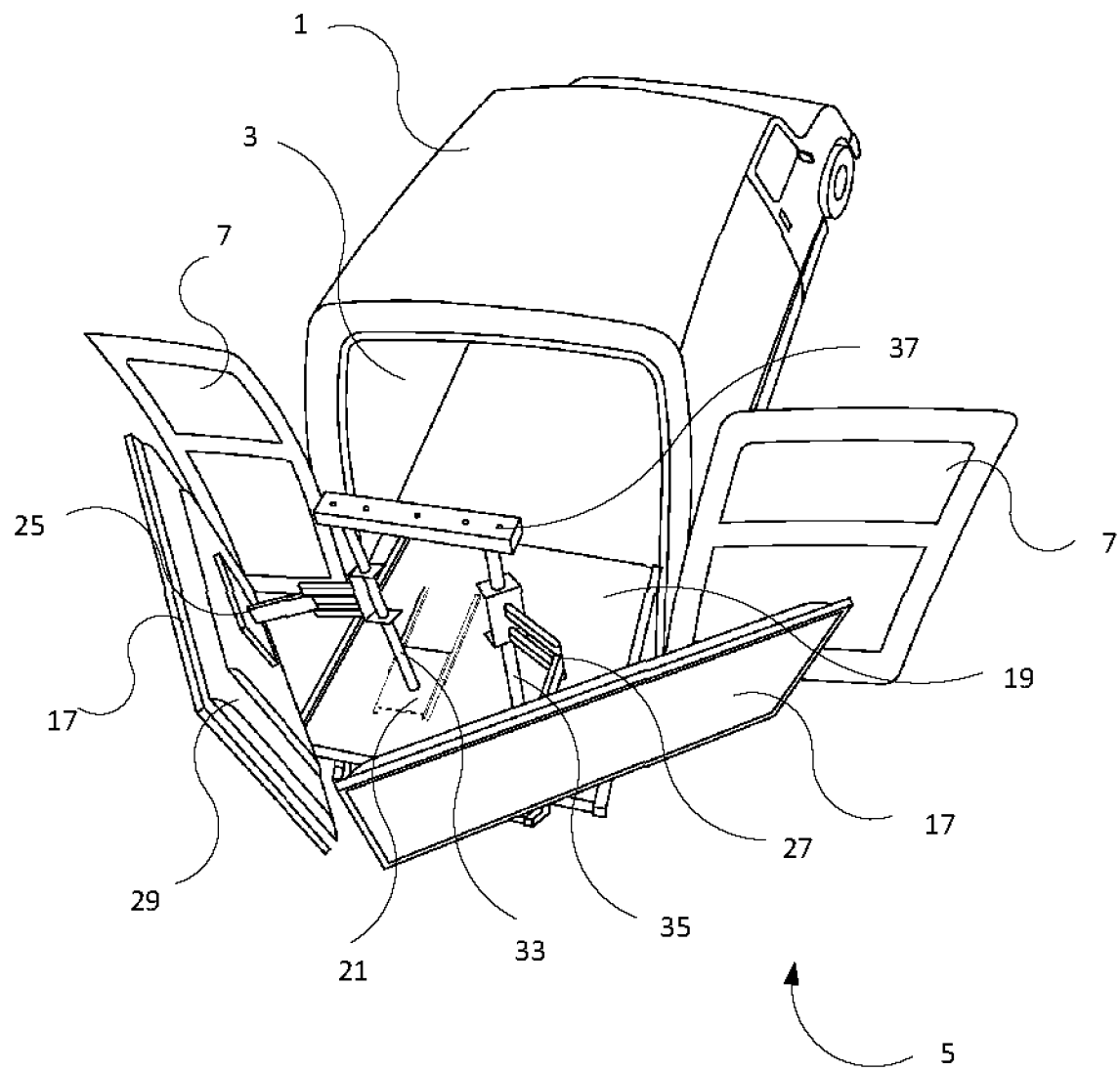
FIG. 1 shows a perspective view of an exemplary system in an extended and actuated position.

NUMERALS OF THE FIGURES 1. automobile
3. Interior space
5. Exterior space
7. door
9. base
11. threshold
13. Left interior side
15. Right interior side
17. Display composite
19. Sliding platform
21. First sliding mount
23. Second sliding mount
25. First articulating arm
27. Second articulating arm
29. First screen mount
31. Second screen mount
33. First screen mount column
35. Second screen mount column
37. fastener
39. Power source
41. table
43. Entertainment console
45. controller
47. speaker
49. Data receiver and transmitter
51. Patron
53. Patron position

GLOSSARY

"display composite" as used herein means a composite of a display screen, a screen mount, a sliding mount, a mount column, and an articulating arm.

"fastener" as used herein means a nail, screw, staple, lug, nut, washer, grommet, adhesive, hook-and-loop closure, or any item configured to secure one or more items together fixably or removably.

"multimedia content" as used herein means video, photographic, audio, three-dimensional, holographic, text, or any content capable of being displayed on a display screen.

"automobile" as used herein means any vehicle having an interior space and at least one door. Vehicles include cars, vans, trucks, trains, limousines, sport utility vehicles, hatchbacks, carts, trains, busses, and trolleys.

DETAILED DESCRIPTION

The present disclosure provides generally for a mobile gaming system and methods of use thereof. The system comprises an automobile. The automobile comprises an interior space, exterior space, door, base, threshold, left interior side, and right interior side. The system comprises a pair of display screens. The display screens comprise a right edge, a left edge, a top edge, a bottom edge, a screen display, and a screen rear. The system comprises platforms and mounts including a sliding platform, two sliding mounts, two screen mounts, two articulating arms, and two screen mount columns. Additionally, the mounts and platforms are connected with fasteners. The display composites are arranged in the automobile interior in a frameless and parallel configuration that may be placed in an extended position or retracted position. The system may contain peripherals such as a power source, a table, an entertainment console, a controller, a speaker, and a data receiver and transmitter. Patrons align with the display screens at a patron position.

Detailed Descriptions of the Drawings

Referring now to FIG. 1 a perspective view of an exemplary system in an extended and actuated position is shown. The numerals of the figures are arranged as indicated.

Figure 2:
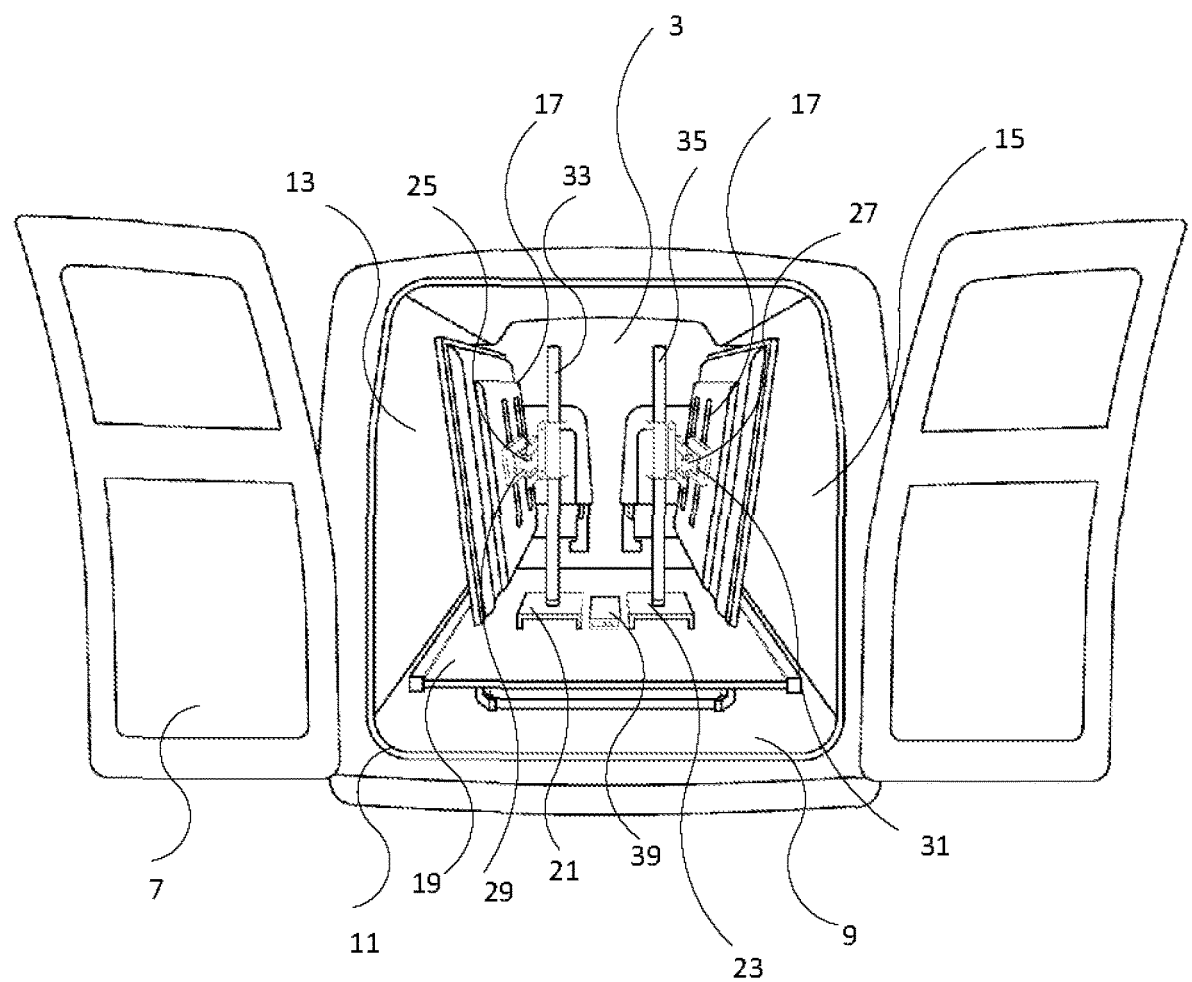
FIG. 2 shows a front view of an exemplary system in a retracted parallel position.

Referring now to FIG. 2, a front view of an exemplary system in a retracted parallel position is shown. The numerals of the figures are arranged as indicated.

Figure 3:
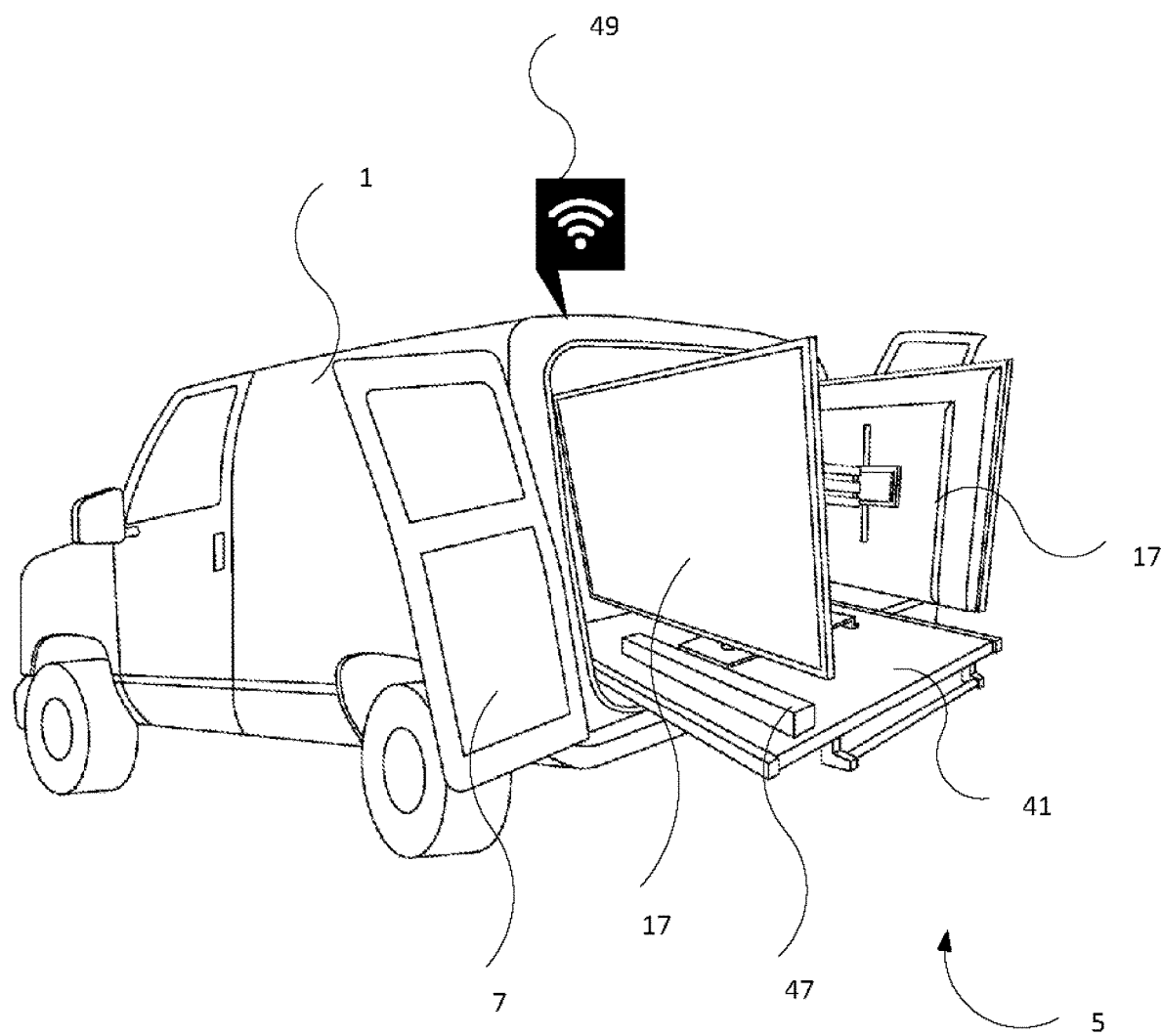
FIG. 3 shows a three-quarter view of an exemplary system in an extended parallel position.

Referring now to FIG. 3, a three-quarter view of an exemplary system in an extended parallel position is shown. The numerals of the figures are arranged as indicated.

Figure 4:
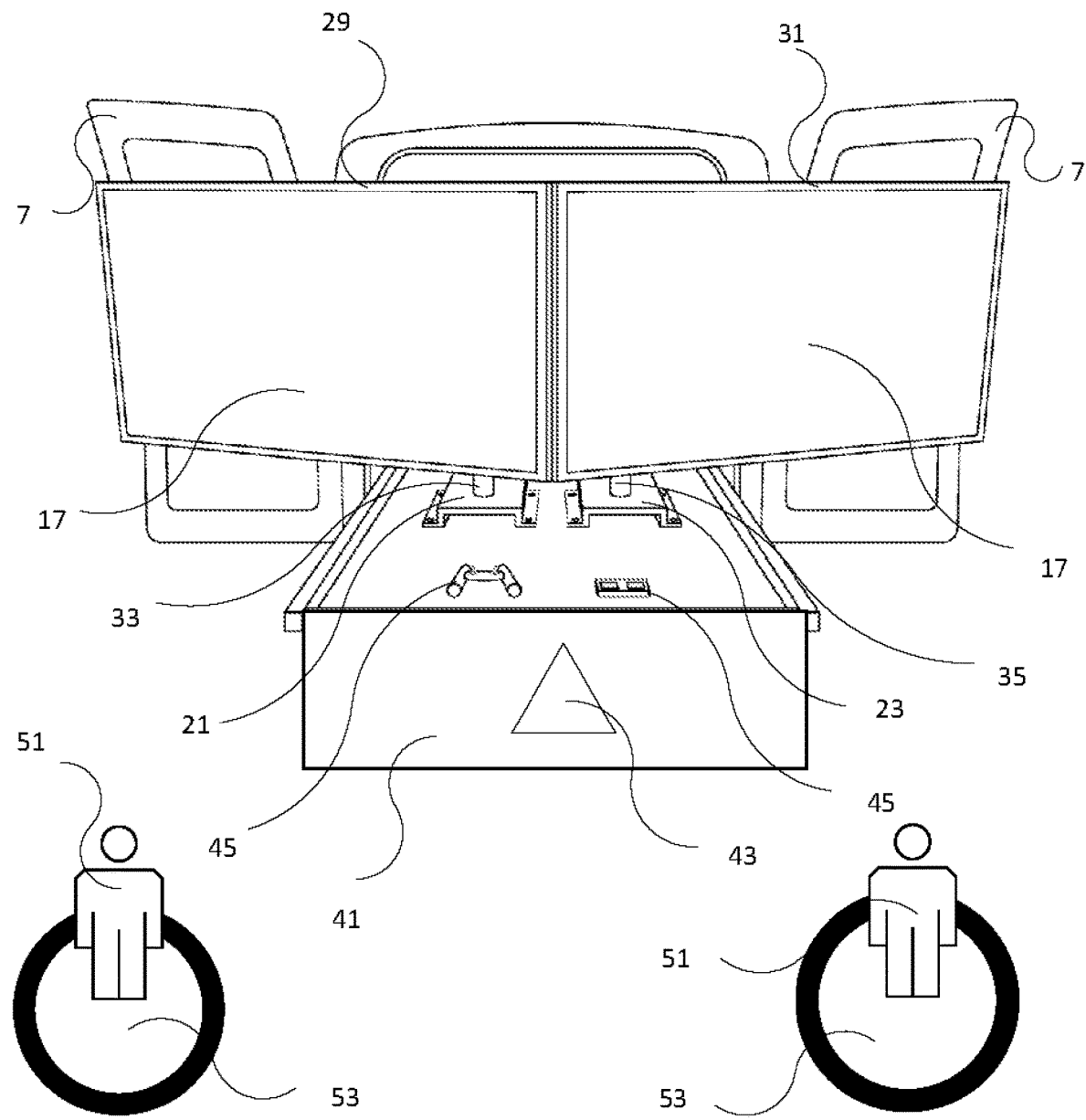
FIG. 4 shows a front view of an exemplary system in an extended actuated position and patron positions.

Referring now to FIG. 4, a front view of an exemplary system in an extended actuated position and patron positions is shown. The numerals of the figures are arranged as indicated.

Figure 5:
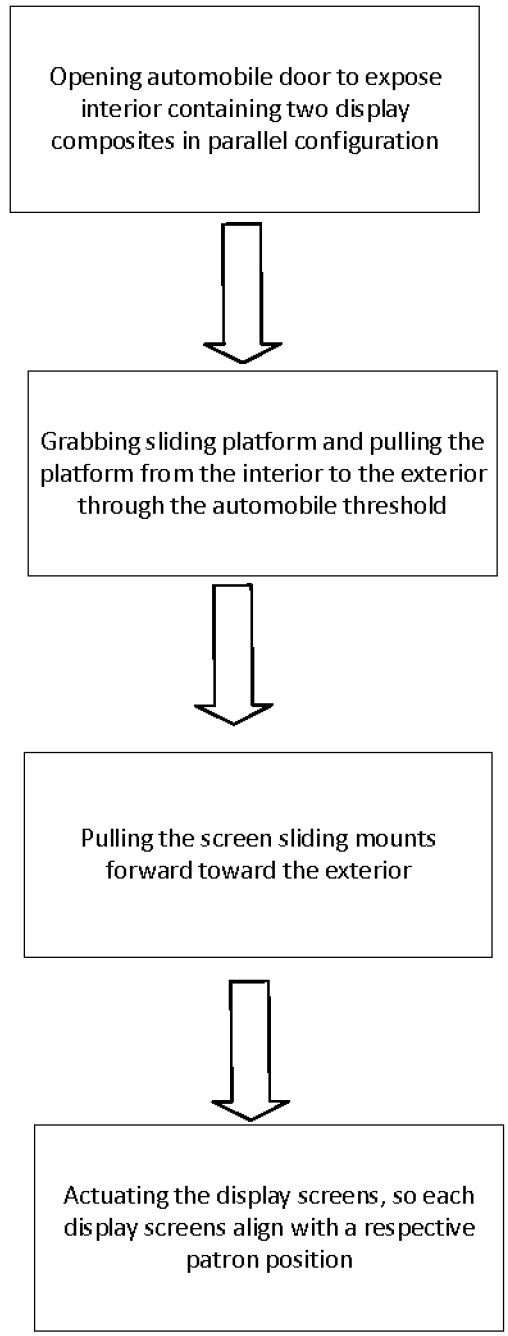
FIG. 5 shows exemplary method steps.

Referring now to FIG. 5, exemplary method steps are shown. Generally, the automobile doors are opened to expose the interior containing two display composites in parallel configuration. The platforms are slid forward from the interior through the threshold to the exterior. The screen sliding mounts are pulled forward toward the exterior. The arms are actuated to position the screens in an extended actuated configuration. The patrons have a patron position aligned with each respective display screen. The patrons interact with the multimedia content exhibited on the display screens further comprising pushing the platform through the threshold and into the automobile interior.

In some methods, the following steps can be taken: closing the automobile door; activating an entertainment console; connecting the display screens to a power source; activating electrical power to the display screens; exhibiting multimedia content on the display screens; and comprising patrons interacting with the multimedia content.

Conclusion

A number of embodiments of the present disclosure have been described. While this specification contains many specific implementation details, this specification should not be construed as limitations on the scope of any disclosures or of what may be claimed. The specification presents descriptions of features specific to particular embodiments of the present disclosure.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. Nevertheless, it will be understood that various modifications may be made without departing from the spirit and scope of the claimed disclosure.

What is claimed is:

1. A mobile gaming system, comprising:
a first display screen and a second display screen in communication with an entertainment console, wherein each of the first and second display screens includes a screen display, a rear side, left edge, a right edge, a top edge, and a bottom edge, the first and second display screens each have a diagonal measurement of fifty to ninety inches;
a sliding platform mounted in an automobile and moveable between a retracted configuration fully inside the automobile and an extended configuration partially outside the automobile, the sliding platform includes a first support structure and a second support structure mounted on the sliding platform;
a first articulating arm connecting the rear side of the first display screen to the first support structure and a second articulating arm connecting the rear side of the second display screen to the second support structure;
the first and second display screens are stored in the retracted configuration in the automobile with the rear side of the first display screen facing the rear side of second display screen; and
the first and second display screens are viewable by patrons when moved to the extended configuration outside of the automobile when the first and second display screens are rotated nearly 90 degrees such that the right side of the first display screen is adjacent the left side of the second display screen and the screen display of the first display screen and the screen display of the second display screen are facing in approximately the same direction.

* * * * *